(12) United States Patent
Korus et al.

(10) Patent No.: US 12,417,227 B2
(45) Date of Patent: Sep. 16, 2025

(54) ROW-LEVEL PERMISSIONING BASED ON EVALUATED POLICIES

(71) Applicant: Palantir Technologies Inc., Denver, CO (US)

(72) Inventors: Hannah Korus, Denver, CO (US); Kevin Chen, Palo Alto, CA (US); Tushar Narayan, San Francisco, CA (US); Thomas Playford, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/190,585

(22) Filed: Mar. 27, 2023

(65) Prior Publication Data

US 2023/0306030 A1    Sep. 28, 2023

Related U.S. Application Data

(60) Provisional application No. 63/365,063, filed on May 20, 2022, provisional application No. 63/362,584, filed on Apr. 6, 2022, provisional application No. 63/362,027, filed on Mar. 28, 2022.

(51) Int. Cl.
  *G06F 16/2455*  (2019.01)
  *G06F 16/2457*  (2019.01)

(52) U.S. Cl.
  CPC .... *G06F 16/24564* (2019.01); *G06F 16/2457* (2019.01)

(58) Field of Classification Search
  CPC ..................... G06F 16/24564; G06F 16/2457
  USPC ........................................................ 707/694
  See application file for complete search history.

(56) References Cited

U.S. PATENT DOCUMENTS

2007/0276835 A1    11/2007  Murthy
2009/0094193 A1*    4/2009  King .................... G06F 21/6227
2017/0359379 A1*   12/2017  Elliot ...................... H04L 63/08
(Continued)

FOREIGN PATENT DOCUMENTS

EP    4254245    10/2023

OTHER PUBLICATIONS

Official Communication for European Patent Application No. 23164563.1 dated May 26, 2023.
(Continued)

*Primary Examiner* — Joshua Bullock
(74) *Attorney, Agent, or Firm* — Knobbe, Martens, Olson & Bear, LLP

(57) ABSTRACT

A computer system is disclosed that provides classification-based access controls at the dataset row-level. The system may perform operations including: ingesting a dataset, wherein the dataset comprises a table of rows and columns; determining a column of the table that includes permissions information; applying parsing rules to the column to determine, for each row of the table, a list of permissions markings; receiving, from a user, a request to access the dataset; and in response to receiving the request: determining a permissions policy associated with the user; determining an evaluated policy associated with the user based on the permissions policy; filtering the table based on applying the evaluated policy associated with the user to the permissions markings of each row of the table; and providing the user access to the filtered table.

20 Claims, 17 Drawing Sheets

| Permissions | Budget Spent | Total Posts | Total Promoted | Total Impressions |
|---|---|---|---|---|
| Level 1//Group 1,2 | $29,516.00 | 66 | 33 | 20,357,643 |
| Level 1//Group 2,3 | $29,734.00 | 38 | 33 | 12,027,891 |
| Level 2//Group 1,2 | $29,421.00 | 53 | 32 | 8,239,603 |
| Level 2//Group 2,3 | $29,595.00 | 20 | 20 | 7,857,255 |
| Level 3//Group 1,2 | $27,039.00 | 46 | 42 | 7,393,619 |
| Level 3//Group 2,3 | $29,119.00 | 124 | 122 | 29,529,542 |
| Level 4//Group 1,2 | $29,436.00 | 29 | 29 | 15,701,720 |
| Level 4//Group 2,3 | $29,485.00 | 87 | 87 | 24,899,922 |

(56) References Cited

U.S. PATENT DOCUMENTS

2019/0377891 A1    12/2019  Krieger et al.
2021/0173851 A1*    6/2021  Dorne ................ G06F 16/9532

OTHER PUBLICATIONS

Official Communication for European Patent Application No. 23164563.1 dated Jan. 27, 2025.

* cited by examiner

| Permissions | Budget Spent | Total Posts | Total Promoted | Total Impressions |
|---|---|---|---|---|
| Level 1//Group 1,2 | $29,516.00 | 66 | 33 | 20,357,643 |
| Level 1//Group 2,3 | $29,734.00 | 38 | 33 | 12,027,891 |
| Level 2//Group 1,2 | $29,421.00 | 53 | 32 | 8,239,603 |
| Level 2//Group 2,3 | $29,595.00 | 20 | 20 | 7,857,255 |
| Level 3//Group 1,2 | $27,039.00 | 46 | 42 | 7,393,619 |
| Level 3//Group 2,3 | $29,119.00 | 124 | 122 | 29,529,542 |
| Level 4//Group 1,2 | $29,436.00 | 29 | 29 | 15,701,720 |
| Level 4//Group 2,3 | $29,485.00 | 87 | 87 | 24,899,922 |

FIG. 5A

Create restricted view

Save as
ⓘ A new file will be created once you complete this process.

② Compose a granular policy
A granular policy is a combination of rules that describe what rows can be seen by different people.

Edit granular policy  ✎ Edit policy  </> View policy in JSON  ⚙ Test Policy

↑Previous  Next↓

Match [all ▽] of the rule(s) below:

[                    ▽]

+ Add a [rule] or a [Logical operator]

Fill in your rule (2/3)

The user's (Attribute) (Includes) column (Column) ——— 1010

Editing rule
A rule needs to have two elements and a comparison method. Click above to begin filling in your rule.

[Cancel] [Save rule]

Review access requirements
ⓘ Understand who will be able to access the restricted view once it's created.

Summary
ⓘ Review before creating.

[Cancel] [Create]

FIG. 10

Create restricted view — 1100

× ↑Previous ↓Next

Save as
① A new file will be created once you complete this process.

Compose a granular policy
② A granular policy is a combination of rules that describe what rows can be seen by different people.

Edit granular policy  ✎Edit policy  </> View policy in JSON  ⊛Test Policy

Fill in your rule (2/3)
The user's `attribute` `includes` `column` — 1110

Match `all ▽` of the rule(s) below:

⌄

[Logical operator]

+ Add a `rule` or a `Logical operator`

What user attribute do you want to compare? — 1120
Change what to compare

🔍 Search user Attribute
👤 User ID
👤 Username
👥 Group ID
👥 Groupname
🏢 Organization marking ID
▽ Markings
Permission Level
email:primary
Other user attribute Cancel  Save rule

Review access requirements
③ Understand who will be able to access the restricted view once it's created.

Summary
④ Review before creating.

Cancel  Create

FIG. 11

Create restricted view — 1200

① Save as
A new file will be created once you complete this process.

② Compose a granular policy
A granular policy is a combination of rules that describe what rows can be seen by different people.

Edit granular policy  ✎Edit policy  </> View policy in JSON  ⊚Test Policy

Fill in your rule (3/3)

The user's [permission level] [satisfies] column<column> — 1210

Match [all ▽] of the rule(s) below:

[ Logical operator ]

+ Add a [rule] or a [Logical operator]

What column attribute do you want to compare?
Change what to compare

🔍 Search column Attribute — 1220
  Permission
  Budget Spent
  Total Posts
  Total Promoted
  Total Impressions
  Custom field + Add nested field

[Cancel] [Save rule]

↑Previous  Next↓

③ Review access requirements
Understand who will be able to access the restricted view once it's created.

④ Summary
Review before creating.

[Cancel] [Create]

FIG. 12

ROW-LEVEL PERMISSIONING BASED ON EVALUATED POLICIES

CROSS-REFERENCE TO RELATED APPLICATIONS

This application claims benefit of U.S. Provisional Patent Application Nos. 63/362,027, filed Mar. 28, 2022, titled "ROW-LEVEL PERMISSIONING BASED ON EVALUATED POLICIES", 63/362,584, filed Apr. 6, 2022, titled "ROW-LEVEL PERMISSIONING BASED ON EVALUATED POLICIES", and 63/365,063, filed May 20, 2022, titled "ROW-LEVEL PERMISSIONING BASED ON EVALUATED POLICIES". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for controlling access to electronic datasets, which may be datasets of a database. More specifically, the present disclosure includes controlling access by supporting row-level permissions based on permissions data parsing and generating row-level evaluated policies.

BACKGROUND

A background is provided for introductory purposes and to aid the reader in understanding the detailed description. The background should not be taken as an admission of any prior art to the claims.

Some computer systems limit access to electronic data assets by requiring authentication credentials, such as a username and password. Some computer systems also impose authorization restrictions that specify which user or groups of users can read, write, or modify an electronic data asset. In general, the permissions are at dataset level. Thus, multiple users with the same level of permission can access the same dataset.

Furthermore, these computer systems can be insufficient to process various datasets. For example, a dataset can be composed of various types. However, the computer systems may only support a standard permission type and process only a certain type of dataset format.

SUMMARY

The systems, methods, and devices described herein each have several aspects, no single one of which is solely responsible for its desirable attributes. Without limiting the scope of this disclosure, several non-limiting features will now be described briefly.

In general, when databases containing datasets have permission support or require user authorization to access, the permissioning is implemented at the dataset level. Thus, only users with permission for the whole dataset can see the rows of the dataset. However, potentially certain pieces or rows of the dataset may be more sensitive or require higher-level permissions than other pieces or rows of data. There may not be easy methods of granting access to the user to just particular rows of the dataset, where the user only has permission to access the specific rows. Conventionally, the computer systems may provide the permissioning support at the row level of the dataset by duplicating each permission level information into different datasets, that is separate datasets, e.g. tables. However, the conventional method may cause data fragmentation, data inconsistency, and/or loss of data integrity. Example embodiments may provide a way to avoid duplication, e.g. avoiding creating separate datasets, e.g. tables, which may inevitable cause said fragmentation, data inconsistency and/or loss of data integrity.

Embodiments of the present disclosure include computer systems for supporting row-level permissioning based on evaluated policies (also referred to herein as evaluated policy objects). The computer systems are configured to permit a user to access specific rows of a dataset where the user has proper permission to access the rows without additionally processing the dataset, such as by duplicating the lower permission level information into another dataset for users with that level of permission. Advantageously, by permitting a user to access the specific rows of the dataset based on the user's permission level, the user can directly access the rows without causing data fragmentation, data inconsistency, or loss of data integrity. All data (e.g. rows) of the dataset can remain in the same dataset, one or more elements of which can be updated without having to update different, fragmented datasets as in the conventional case.

In various embodiments, datasets are stored in the form of a table. The table comprises rows and columns. Each row of the table represents information, where at least one column of the table represents a permission level that the row requires to permit a user to access the row.

In various embodiments, parsing rules can be applied to datasets. The parsing rules are applied to identify the permission information associated with each independent row. The parsing rules are customizable. By applying the parsing rules, any dataset or data objects having non-standard, idiosyncratic formats can be converted into a standard format. The standard format includes a column that represents the permission level (in the form of lists of permissions markings) of each independent row. The column can have a standard label or name that makes it identifiable to the system as one representing the permissioning level of the rows. Thus, only users having the appropriate permissions can access particular rows. In some embodiments, the permissions markings can comprise a Boolean expression.

Additionally, a user's permissions can be evaluated to determine (or be converted to) an evaluated policy, which can be a Boolean expression. Advantageously, through the evaluated policy, the computer systems can filter the rows of the dataset matching a user's permissions and the lists of permissions markings at each row of the dataset. In these embodiments, the evaluated policy combined with the lists of permissions markings associated with each row of the dataset can be an efficient filter to allow the user to access only the rows that the user has permission to access.

In various embodiments, lists of permissions markings on each row of the dataset represents a level of permission needs to access the row information. The lists of permissions markings can be specific to the particular classification scheme used by the source database. The lists of permissions markings can represent a level of permission of each row of the dataset. Each row of the dataset can have a list of permissions markings that are parsed from the raw dataset. For example, one possible classification scheme may have the following possible markings: owner; admin; reader;

writer. In another example, the markings can be level 1, level 2, level 3 and so on. The markings for the classification can be customized based on its application. The lists of permissions markings can be based on a classification scheme including hierarchical categories of permissions, where each successive level of permissions allows access to information at any lower level of permissions. Although aspects of the present application will be described with regard to the illustrative classification scheme (permission level), one skilled in the relevant art will appreciate that one or more aspects of the present application may be implemented in accordance with various applications.

In various embodiments, the dataset can be further filtered based on a search query. The evaluated policy and the search query can be combined, and compared to the permissions markings at each row of the dataset, so the user can access the rows that the user has permissions for. Thus, in submitting a search query, the user can be presented with rows relevant to the search query and for which they have access based on the permissions markings. This makes the set of search results more compact and less data is required to be sent for display at the user device.

Further, according to various embodiments, various interactive graphical user interfaces can be provided for allowing various types of users to interact with the systems and methods described herein to, for example, generate, review, and/or modify filtering rules, parsing rules, evaluated policy objects, classification-based access objects, data access request objects, and/or the like.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in-memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with and presentation of various types of electronic data.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same becomes better understood by reference to the following detailed description, when taken in conjunction with the accompanying drawings, wherein:

FIGS. 5A-5B show examples of datasets in the form of tables including rows and columns, according to one or more embodiments;

FIGS. 9-12 illustrate example interactive graphical user interfaces of the system related to row-level permissioning, according to one or more embodiments.

DETAILED DESCRIPTION

Figure 1:
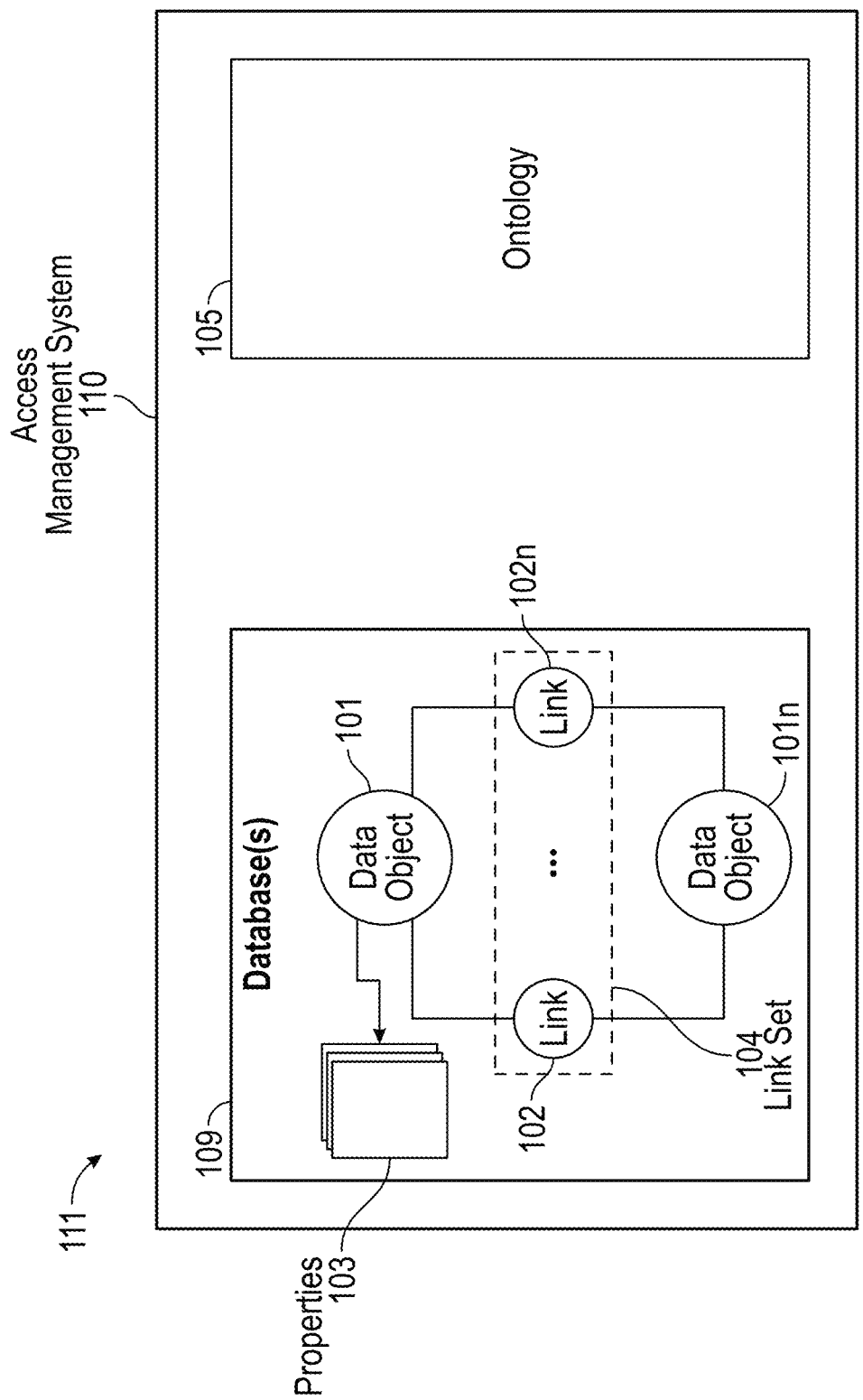
FIG. 1 shows a block diagram illustrating an example access management system, including an example object-centric conceptual data model, according to one or more embodiments of the present disclosure.

Although certain preferred embodiments and examples are disclosed below, the inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order-dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As noted above, in general, when databases containing datasets have permissioning support or require user authorization to access, the permissioning is typically implemented at the dataset level. Thus, only users with authorization for the whole dataset can see the rows of the dataset. However, potentially certain pieces or rows of the dataset may be more sensitive or require higher level permissions than other pieces or rows of data. For example, when sharing medical records certain information can be shared for research purposes, but certain information cannot be shared due to privacy and medical information regulations. Alternatively, a row in a dataset may require a higher level of permissions than another row in the same dataset. In both examples, dataset level permissioning would put all data in a dataset at the same permission level, thus potentially raising the permission level of some information above what is necessary. This may require an organization to duplicate the lower permission level information into another dataset (thereby requiring more storage capacity) for users with that level of permission, which can lead to fragmentation of data, data inconsistency, or loss of data integrity.

Furthermore, permissioning support is not universal with many organizations having their own systems for permissioning. For example, some classification-based access controls may include hierarchical categories of permissions, where each successive level of permissions allows access to information permissioned at any lower level of permissions. Alternatively, information could have two permissioning systems which are unrelated. For example, a database may require that a user has a proper permissions level as well as some other qualification. Alternatively, a permissioning system could be proprietary to an organization or homegrown and developed within an organization. As such, the permissioning system could be non-standard and idiosyncratic both in organization as well as implementation within a database.

The non-standard and idiosyncratic nature of permissioning systems makes it difficult for organizations to move their permissioning system into a standardized cloud-based system. Different tools and applications in a cloud-based system interpret data differently.

The system of the present disclosure can enable the permissioning of datasets at the row-level rather than the dataset level and without requiring duplication of datasets. The present disclosure can therefore control access to data at a more granular level without the need to use more memory space, as well as avoiding or mitigating the above issues of fragmentation of data, data inconsistency, or loss of data integrity. Accordingly, the same dataset could be seen by multiple users with differing permission levels such that each user may see a different subset of the dataset, depending on their specific permissions policies and/or filtering rules associated with the dataset. For example, a medical researcher may be able to look at certain information that is considered non-identifying or non-protected, while a personal physician could see personally-identifying information for their patients when viewing the same dataset. Alternatively, a dataset may include some top-level permissions information and some lower-level permissions information. A user with lower-level permissions may be able to access the dataset, but unable to see the data designated with high-level permissions. However, a user with high-level permissions may see both the high-level permissions information and lower-level permissions information.

Advantageously, allowing for row-level permissioning can lead to less fragmentation, less data inconsistency, and less loss of integrity when databases and permissioning systems are properly maintained. It can also lead to allowing more data to be shared and accessed by users with lower levels of permissioning as individual pieces of a dataset may be accessible, whereas dataset-level permissioning may have locked these users out.

Furthermore, different organizations may have their own non-standard, idiosyncratic permissioning systems and formats. The technical solutions discussed herein can allow the system to parse permissioning metadata in a way that satisfies various permissioning protocols and formats. This can lead to more efficient moving of permissioned information from one system to another (e.g., into a cloud system) as the system is able to adapt to the idiosyncratic format of the organization. This parsing of the data formats in the permissioning systems can convert any non-standard or idiosyncratic format of a dataset or a set of data objects having permissions information into a standard format, e.g., with a column that represents the permissions information. Examples may therefore enable provision of a data structure based on a received dataset in which the data structure comprises, as part of the dataset, at least one column that represents the permissions information. The representation of the permissions information can be in the form of permissions markings or lists of permissions markings on the individual row of the dataset. Where an organization's permissioning system is relatively complex, e.g. requiring one part of the permissioning system to query another part of the permissioning system, the parsing of the data may effectively collapse an hierarchical definition for an individual rows into a respective permission marking which is provide in the relevant column for the row. The permissions markings on each row of the dataset are then usable by the various software applications to filter the dataset to only rows that satisfy the user's permission information.

In addition to the permissions functionality described above (and detailed in the present disclosure), the system may also provide authorization restrictions specifying which users or groups of users can read, write, or modify a data asset.

A dataset may include one or more data items. The dataset can be stored in the form of a table and/or as data objects. The table can comprise rows and columns. Each row of the table can represent information, where at least one column of the table can represent a permission level that the row requires to permit a user to access the row.

Embodiments of the present disclosure include computer systems for enabling the permissioning of datasets at the row-level. A row of the dataset can represent a particular piece of information. The systems may provide a structure to show particular rows of a dataset to a user with a permission level required by the rows. Through the use of the systems, a dataset can be assessed by multiple users, and each user can see different rows of the dataset depending on the user's permission level. Unlike systems that require a duplicating process to organize a dataset based on its permission level, the systems described herein can allow users to access the dataset's rows without the duplicating process thereby saving memory. This can be accomplished, for example, by parsing each row of the dataset and comparing each row's permissions markings with a permission information which is expressed as a user's evaluated policy. After applying parsing rules, each row includes permissions markings that are required for a user to access the row information. Each row's permissions markings can be stored in a column. The user's evaluated policy can be used to filter the column by comparing (or matching) the user's evaluated policy with the permissions markings for each row of the dataset. The user's evaluated policy can be expressed as a Boolean expression.

Embodiments of the present disclosure can include computer systems for providing permissions markings for each row of a dataset. After ingesting a dataset that includes a table of rows and columns, the computer systems can determine a column of the table that includes permissions information. The computer systems can apply parsing rules to the determined column to determine permissions markings of each row of the table and thereby provide a data structure based on the dataset which includes the determined column. The permissions markings of each row of the table represent a user's required permission level to access the row. In some embodiments, after applying the parsing rules, each row of the table can have a separate list of permissions markings. The permissions markings or the lists of permissions markings can optionally be expressed using a Boolean expression.

In some embodiments, the datasets can be data objects. In these embodiments, the computer systems can determine one or more properties of the data objects that include permissions information. The computer systems can apply parsing rules to the determined properties to determine a permission markings for each data object. In some embodiments, after applying the parsing rules, each data object can have permissions marking that represents a permission level.

A computer system or software framework is provided for enabling the permissioning of datasets at the row-level based on permissions markings of each row, and the user's evaluated policy, an expression of the user's permission information (or permission level associated with the user). The computer systems can enable a user to access the rows of the dataset by determining the permission information and evaluated policy associated with the user. In various embodiments, the user's evaluated policy can be determined by converting the user's permission information into the evaluated policy. The evaluated policy can be represented as a Boolean expression. After determining the evaluated policy associated with the user, the computer systems can filter the dataset based on comparing the evaluated policy associated with the user with the permissions markings of each row of the table and optionally further based on applying one or more filtering rules. A user can provide a query to the computer systems, where the computer systems further filters the dataset based on the search query.

In various embodiments, a dataset or data objects access in the system of the present disclosure is based on classification-based access controls. With such controls, or permissions, the dataset or data objects can be in the form of a table and can include classification markings in a column of a table object. The marking can be specific to the particular classification scheme used by the source database. For example, one possible classification scheme may have the following possible markings: owner; admin; reader; writer. In another example, the markings can be level 1, level 2, level 3 and so on. The markings for the classification can be customized based on their application. The markings can be customized based on their application. Although aspects of the present application will be described with regard to the illustrative classification scheme (permission level), one skilled in the relevant art will appreciate that one or more aspects of the present application may be implemented in accordance with various applications.

II. Terms

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Dataset: Any data item or group of data items. May include data and items that can be accessed by a user through a computer system. Non-limiting examples include files, folders, computing machines, memory, processors, servers, hard drives, databases, laptops, RSA tokens, etc. Also referred to herein as "resources", "computer resources", or "data assets".

Data Object or Object: A data container for information representing specific things that have a number of definable properties. For example, a data object can represent an entity such as a person or user, a place, a group, an organization, a resource, a data asset, a request, a purpose, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

Object Type: A type of a data object (e.g., user, data asset, purpose, request, etc.). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

III. Example Object Centric Data Model

To provide a framework for the following discussion of specific systems and methods described herein, an example of access management system 110 using an ontology 105 will now be described. The access management system 110 is described in the context of an example computing environment 111. This description is provided for the purpose of providing an example and is not intended to limit the techniques to the example data model, the example access management system, or the example access management system's use of an ontology to represent information.

In some embodiments, a body of data is conceptually structured according to an object-centric data model represented by ontology 105. The conceptual data model is independent of any particular database used for durably storing one or more database(s) 109 based on ontology 105. For example, each object of the conceptual data model may correspond to one or more rows in a relational database or an entry in Lightweight Directory Access Protocol (LDAP) database, or any combination of one or more databases.

FIG. 1 shows a block diagram illustrating an example access management system, including an example object-centric conceptual data model, according to one or more embodiments of the present disclosure. An ontology 105, as noted above, may include stored information providing a data model for storage of data in the database 109. The ontology 105 may be defined by one or more object types, which may each be associated with one or more property types. At the highest level of description, data object 101 is a container for information representing things in the world. For example, data object 101 can represent an entity such as a person or user, a place, a group, an organization, a resource, a data asset, a request, a purpose, a link, or other noun. Data object 101 can represent an event that happens at a point in time or for a duration. Data object 101 can represent a document or other unstructured data source such as an e-mail message, a news report, or a written paper or article. Each data object 101 is associated with a unique identifier that uniquely identifies the data object within the access management system.

Different types of data objects may have different property types. For example, a "Person" data object might have an "Eye Color" property type and an "Event" data object might have a "Date" property type. Each property 103 as represented by data in the access management system 110 may have a property type defined by the ontology 105 used by the database 105.

Objects may be instantiated in the database 109 in accordance with the corresponding object definition for the particular object in the ontology 105. For example, a specific folder (e.g., an object of type "Data Asset") at "C:\Folder" (e.g., a property of type "directory") may be stored in the database 109 as a data asset object metadata as defined within the ontology 105.

The data objects defined in the ontology 105 may support property multiplicity. In particular, a data object 101 may be allowed to have more than one property 103 of the same property type. For example, a "Person" data object might have multiple "Address" properties or multiple "Name" properties.

Each link 102 represents a connection between two data objects 101. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular business office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing accountants at a finance firm, may both have a "CPA Qualified" property that indicates that both of them have CPA licenses. If both people work at the same office, then their "Business Address" properties likely contain similar, if not identical property values. In some embodiments, a link between two data objects may be established based on similar or matching properties (e.g., property types and/or property values) of the data objects. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 101 can have multiple links with another data object 101 to form a link set. Each link 102 as represented by data in a database may have a link type defined by the database ontology used by the database.

Figure 2A:
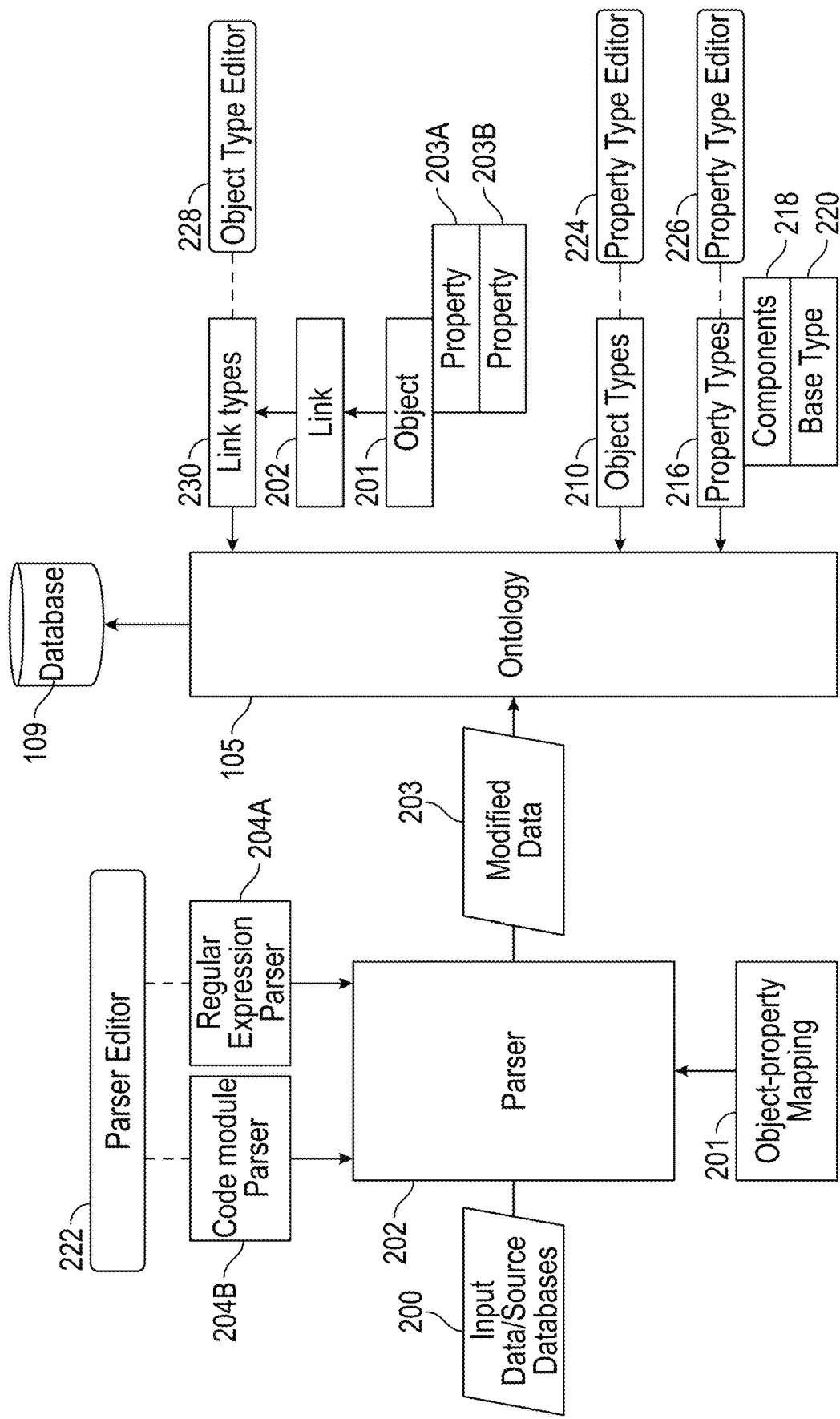
FIG. 2A shows a block diagram illustrating example components and data that may be used in identifying and storing data according to an ontology, according to one or more embodiments.

FIG. 2A shows a block diagram illustrating example components and data that may be used in identifying and storing data according to an ontology, according to one or more embodiments. In this example, the ontology may be configured, and data in the data model populated, by a system of parsers and ontology configuration tools. In the embodiment of FIG. 2A, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entry, an address for a person, and a date for when a rental car is rented. The parser 202 is able to read a variety of source input data types and determine which type of data it is reading.

In accordance with the discussion above, the example ontology 105 comprises stored information providing the data model of data stored in database 109, and the ontology is defined by one or more object types 210, one or more property types 216, and one or more link types 230. Based on information determined by the parser 202 or other mapping of source input information to object type, one or more data objects 101 may be instantiated in the database 109 based on respective determined object types 210, and each of the objects 101 has one or more properties 103 that are instantiated based on property types 216. Two data objects 101 may be connected by one or more links 102 that may be instantiated based on link types 230. The property types 216 each may comprise one or more data types 218, such as a string, number, etc. Property types 216 may be instantiated based on a base property type 220. For example, a base property type 220 may be "Locations" and a property type 216 may be "Home."

In some embodiments, an administrator of the system (e.g., a user with the proper role and/or permissions) uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201 (including properties 208A, 208B), the parser 202 selects one of the parser definitions that is associated with a property type in the input data. The parser parses an input data field using the selected parser definition, resulting in creating new or modified data 203. The new or modified data 203 is added to the database 109 according to ontology 105 by storing values of the new or modified data in a property of the specified property type. As a result, input data 200 having varying format or syntax can be created in database 109. The ontology 105 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

IV. Example Data Management System

Figure 2B:
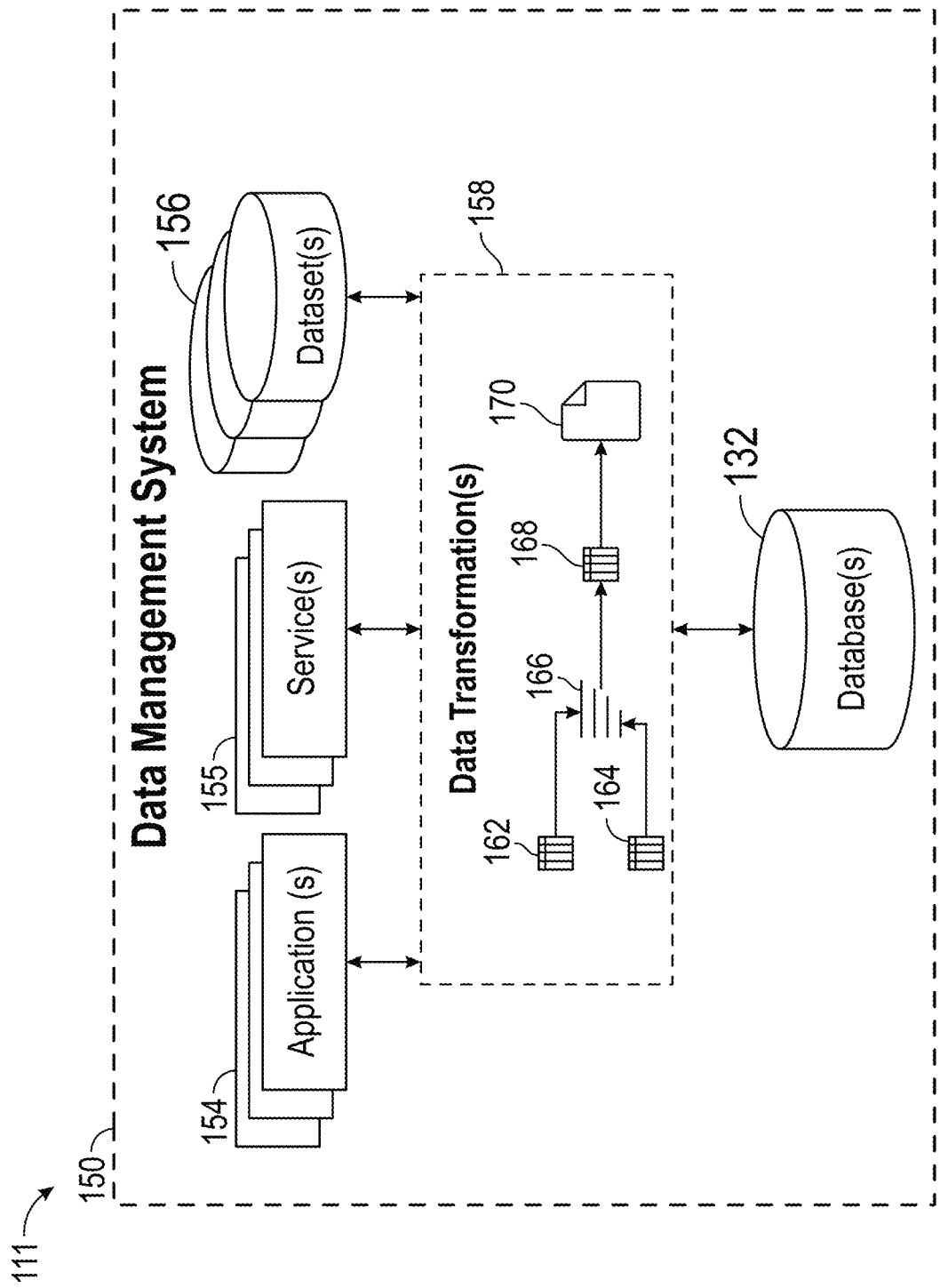
FIG. 2B shows a block diagram illustrating an example data management system, according to one or more embodiments.

FIG. 2B shows a block diagram illustrating an example data management system 150, according to one or more embodiments. In particular, the data management system 150 can be used in the context of computing environment 111 along with the access management system 110 described above with respect to FIG. 1. In the embodiments of FIG. 2B, computing environment 111 can be similar to, overlap with, and/or be used in conjunction with the computing environment 111 of FIG. 1. For example, the computing environment 111 can include a database 132, which may be similar to the database 109 in the computing environment 111 of FIG. 1. However, the computing environment 111 can also include the data management system 150.

The example data management system 150 includes one or more applications 154, one or more services 155, one or more initial datasets 156, and a data transformation process 158 (also referred to herein as a build process). The example data management system 150 can include a data pipeline system. The data management system 150 can transform data and record the data transformations. The one or more applications 154 can include applications that enable users to view datasets, interact with datasets, filter datasets, and/or configure dataset transformation processes or builds. The one or more services 155 can include services that can trigger the data transformation builds and application programming interface ("API") services for receiving and transmitting data. The one or more initial datasets 156 can be automatically retrieved from external sources and/or can be manually imported by a user. The one or more initial datasets 156 can be in many different formats such as a tabular data format (SQL, delimited, or a spreadsheet data format), a data log format (such as network logs), or time series data (such as sensor data).

The data management system 150, via the one or more services 155, can apply the data transformation process 158. An example data transformation process 158 is shown. The data management system 150 can receive one or more initial datasets 162, 164. The data management system 150 can apply a transformation to the dataset(s). For example, the data management system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 132. Each of the steps in the example data transformation process 158 can be recorded by the data management system 150 and made available as a resource or data asset. For example, a data asset can include a dataset and/or a dataset item, a transformation, or any other step in a data transformation process. As mentioned above, the data transformation process or build 158 can be triggered by the data management system 150, where example triggers can include nightly build processes, detected events, or manual triggers by a user. Additional aspects of data transformations and the data management system 150 are described in further detail below.

The techniques for recording and transforming data in the data management system 150 may include maintaining an immutable history of data recording and transformation actions such as uploading a new dataset version to the data management system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset (s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute transformation A. The underlying data transformation engine interprets the schema information and applies it to the data in the file or files when executing transformation A.

The various data assets (e.g., files, data items, datasets, portions of datasets, transformations, and/or the like) of the data management system 150 may also be stored in the databases 132.

The data management system 150 can include various permissions functionalities. For example, the data management system 150 can implement access control lists and/or other permissions functionality that can enable highly granular permissions of data assets (e.g., files, data items, datasets, portions of datasets, transformations, and/or the like). The permissions may include, for example, specific permissions for read/write/modify, and/or the like, which may be applicable to specific users, groups of users, roles, and/or the like.

In an implementation, the data management system 150 includes "projects", which comprise groups of data assets. Users granted access to a given project are also thereby granted access to all data assets within that project, subject to further permissioning such as read/write/modify, as mentioned above. Furthermore, all data assets within that project can have a form of a table object including rows and columns. As further described herein, in an implementation the access management system 110 expands the permissioning functionality of the data management system 150 by providing row-level permissioning, including parsing and filtering functionality as described herein. Thus, for example, a user may be granted access to particular rows of data assets. Further details regarding row-level permissioning are provided herein.

V. Example Access Management System and Related Computing Environment

Figure 3:
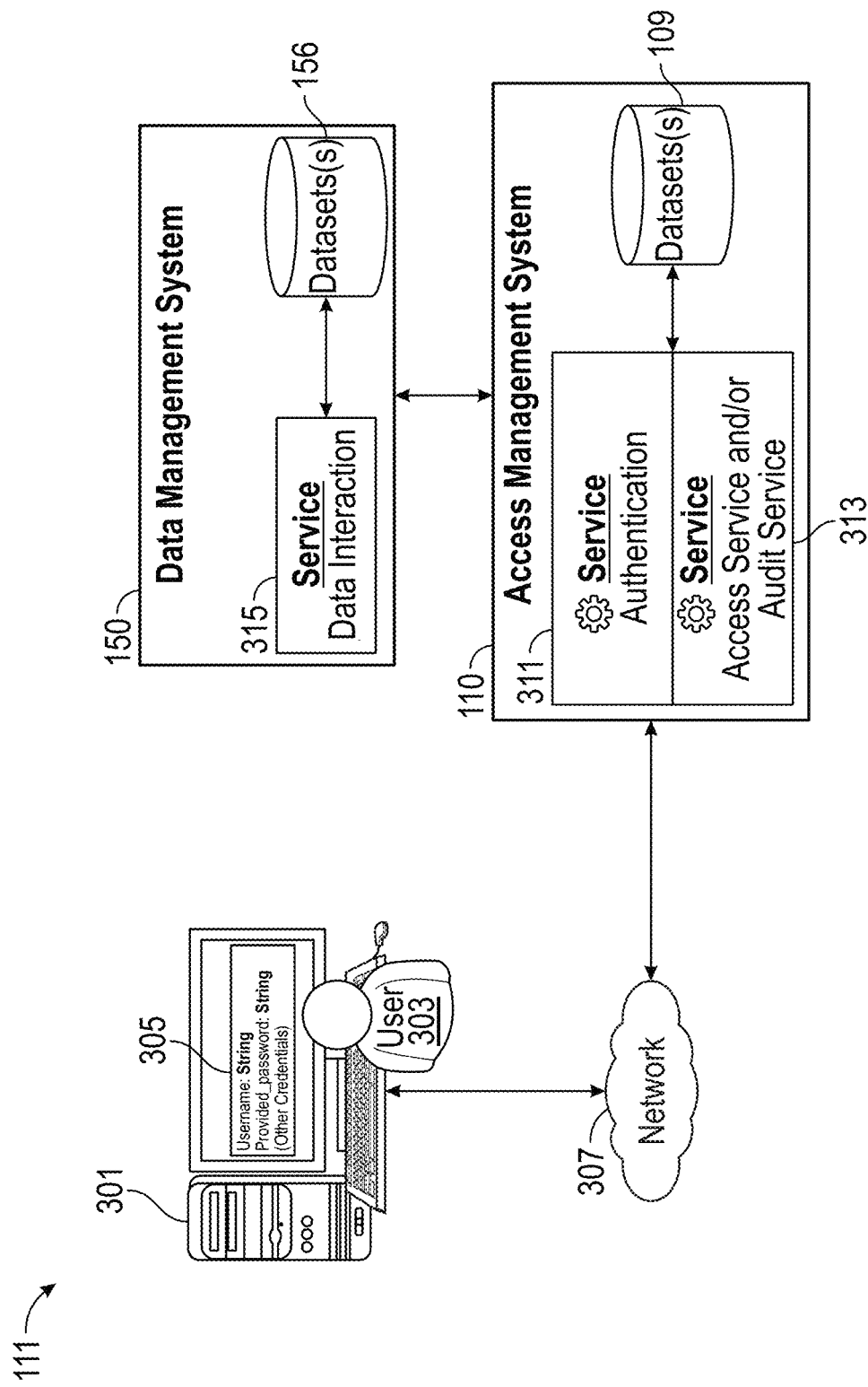
FIG. 3 shows an example block diagram including a computing environment for controlling access to electronic data assets, according to one or more embodiments.

FIG. 3 shows an example block diagram including a computing environment 111 for controlling access to electronic data assets, according to one or more embodiments. The computing environment 111 includes the access management system 110 and the data management system 150, examples of which are described above in reference to FIGS. 1 and 2A-2B. FIG. 3 further shows an example computer system 301 being used by a user 303, and a network 307 enabling communication between the computer system 301 and the access management system 110. As shown, the access management system 110 and the data management system 150 may also be in communication with each other via direct connection, or one or more computer networks. As shown, the access management system 110 may include an authentication service 311 and access service and/or audit service 313 (generally referred to herein simply as access service 313), and the data management system 150 may include a data interaction service 315.

In various embodiments, the various aspects of the access management system 110 and the data management system 150 may be implemented in various ways. For example, the access management system 110 and the data management system 150 may be implemented as a single computing system, and/or various functions or services of the two may be split up and/or arranged differently from that shown in the example computing environment 111 of FIG. 3. Thus, for example, while in FIG. 3 dataset(s) 156 and database(s) 109 are shown as being implemented in the respective data management system 150 and access management system 110, in other implementations, the datasets/databases may be combined, separated into additional datasets/databases, and/or the like. Similarly, the ontology 105, and the database(s) 132 may be combined and/or separated and/or combined with one or more of the dataset(s) and database(s) 109. As another example, the various services of the data management system 150 and access management system 110 may be combined and/or separated in additional services and/or may be implemented in different ones of the various systems of the present disclosure. However, for the purpose of providing a concise description in the present disclosure, the various functionalities are described in reference to the example implementation shown in the computing environment 111 of FIG. 3.

As used herein, the term "system" generally refers to the access management system 110, but may also include various aspects of the data management system 150 and/or other computer systems of the present disclosure.

In general, and as further described herein, the authentication service 311 may authenticate users who access the system, e.g., via a username and password, and/or other appropriate authentication mechanisms. Also, in general and as further described herein, the access service 313 may provide, to various users, row-based access to data assets (e.g., data items, datasets, and/or the like, which may be stored in the dataset(s) 156 and/or another data store or database of the system), and may also provide various functionalities for such permissioning, generating and/or modifying data objects, providing interactive user interfaces, and/or the like. Also, in general and as further described herein, the data interaction service 315 may provide various users with interactive user interfaces for interacting with data assets, e.g., data assets associated with a classification/"project."

The example computer system 301, with which a user 303 may interact, communicates with the system via the network 307 (e.g., a local or extended network, which may include the Internet, and which may include multiple networks that may variously be wired or wireless) to, for example, transmit authentication credentials 305, receive and/or send data and/or commands, provide various interactive user interface functionality to the user. The example computer system 301 is representative of multiple computer systems that may communicate with the access management system 110 and/or data management system 150, and which may be used by various types of users for the various functionality as described herein.

VI. Authentication

A user can be authenticated using authentication credentials, e.g., based on a username and password provided by the user. The user 303 may use a variety of different types of computer systems 301 to access various resources. The computer system 301 can include a desktop, laptop, terminal, smartphone, smartTV, etc. The user 303 may desire to access a variety of resources, such as files, folders, computing machines, memory, processors, servers, hard drives, databases, laptops, RSA tokens, client badges, etc., including time or job slots for using any of the aforementioned resources/data assets. Access to the resources can be restricted and audited as discussed herein.

The authentication credentials 305 provided by a user can include a username and password. In various embodiments, the authentication credentials 305 can include additional information, such as answers to challenge questions, hardware identifiers, passwords received through a second communication channel via N-factor authentication, time-based authentication data, etc. The authentication credentials 305 can be transmitted through a network 307 to the access management system 110 to authenticate the user 303.

The access management system 110 can use the authentication service 311 to compare the authentication credentials 305 against the authentication credentials of known user objects in, e.g., database 109 and/or another database. An example flowchart for the authentication service 311 is discussed in reference to FIG. 4.

Figure 4:
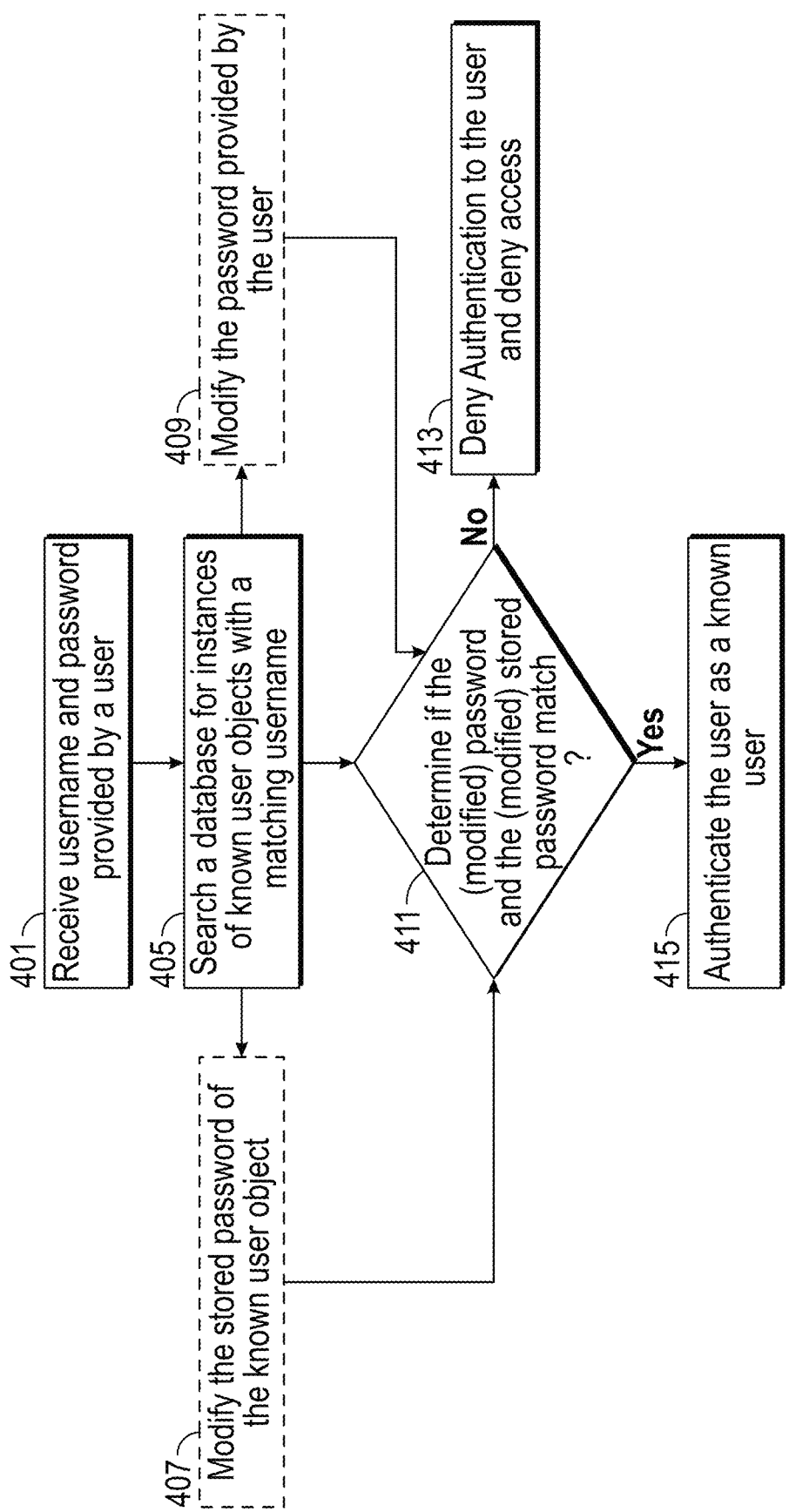
FIG. 4 shows a block diagram illustrating an example authentication service, according to one or more embodiments.

FIG. 4 shows a block diagram illustrating an example authentication service (e.g., which may be implemented by authentication service 311), according to one or more embodiments. At block 401, a username and password provided by a user can be received. In some embodiments, other authentication credentials can be received as well.

At block 405, a database (such as database 109 of FIG. 3) can be searched for instances of known users that match the username provided by the user. In some embodiments, the search can be performed by referencing an index. A matching known user can be found. In some embodiments, the searching for a matching user can be performed at the operating system level.

At block 411, it can be determined if the password provided by the user and the stored password for the matching known user match. In various embodiments, either one or both of the stored password or the password provided by the user may be modified, at block 407 and at block 409 respectively, before the comparison is performed at block 411 to determine a match. Modifications to passwords can include encryption, decryption, salting, hashing, etc. If at block 411, the password provided by the user and the stored password of the known user does not match, then at block 413, the user is denied authentication and denied access. If at block 411, the password provided by the user and the stored password of the known user do match, at block 415, the user can be authenticated as a known user. Further access to resources/data assets can be permissioned/restricted as discussed herein.

VII. Example Row-Level Permissioning Based on Evaluated Policies

After authenticating the identity of a user, the system can then determine which datasets the user is authorized to access and the permissions information (also referred to herein as a "permissions policy") associated with the user. Additionally, the system can determine permission information (in the form of lists of permissions markings) for each row of the dataset and then compare those permission markings with the user's permissions policy (e.g., the evaluated policy), to grant the user access to a dataset based on row-level permissions.

Data access in the system of the present disclosure can be based on enabling the permission of datasets at the row-level. In general, when datasets are ingested into a computer system, the ingested datasets have a non-standard and idiosyncratic format, including for permissioning information. In various embodiments, parsing rules can be applied to the ingested datasets to create a standardized dataset format that includes a column that includes lists of permissions markings for each independent row of the dataset.

FIG. 5A shows an example of an ingested dataset before any parsing or evaluation of permissioning information (e.g., a "raw" dataset). In some embodiments, as shown in FIG. 5A, datasets can be ingested into a computer system in the form of table 500. As shown in FIG. 5A, the table 500 includes rows 502 and columns 504. Each column 504 can be a field of row 502 and represents information of the row 502. For example, as shown in FIG. 5A, each row 502 represents data with information of permission, budget spent, total posts, total promoted, and total impressions. FIG. 5A is merely an example of an ingested dataset, and the number of rows and columns and its information and categories can be determined depending on the application.

Further referring to FIG. 5A, permissions information included in the ingested dataset can be in the form of unstructured (or structured) strings. In some embodiments, the ingested dataset can include at least one column having such permission information, such as example column 504, which includes strings of permissions information in each row, such as "Level 1//Group 1, 2", etc. In these embodiments, the system can determine a particular column or columns having the permission information.

As described below, the system may apply parsing rules to the strings of permission information of the determined one or more columns to create a new or updated data structure based on the ingested dataset. The parsing rules may be pre-defined, user-defined, or automatically determined (e.g., using a machine learning model), and may be in the form of one or more regular expressions or other parsing rules or systems. The parsing rules may be determined based on a source, format, and/or type of the dataset and/or permissions information, among other options. When the parsing rules are applied, the system may determine a list of individual permissions marking for each row of the table. For example, the permissions information can be parsed to identify any classifications, groups, and/or other permissions associated with each of the rows. The list of individual permissions markings can include, for each of the individual permissions markings identified via the string parsing, an item in the list identifying the marking type and the marking value.

Figure 5B:
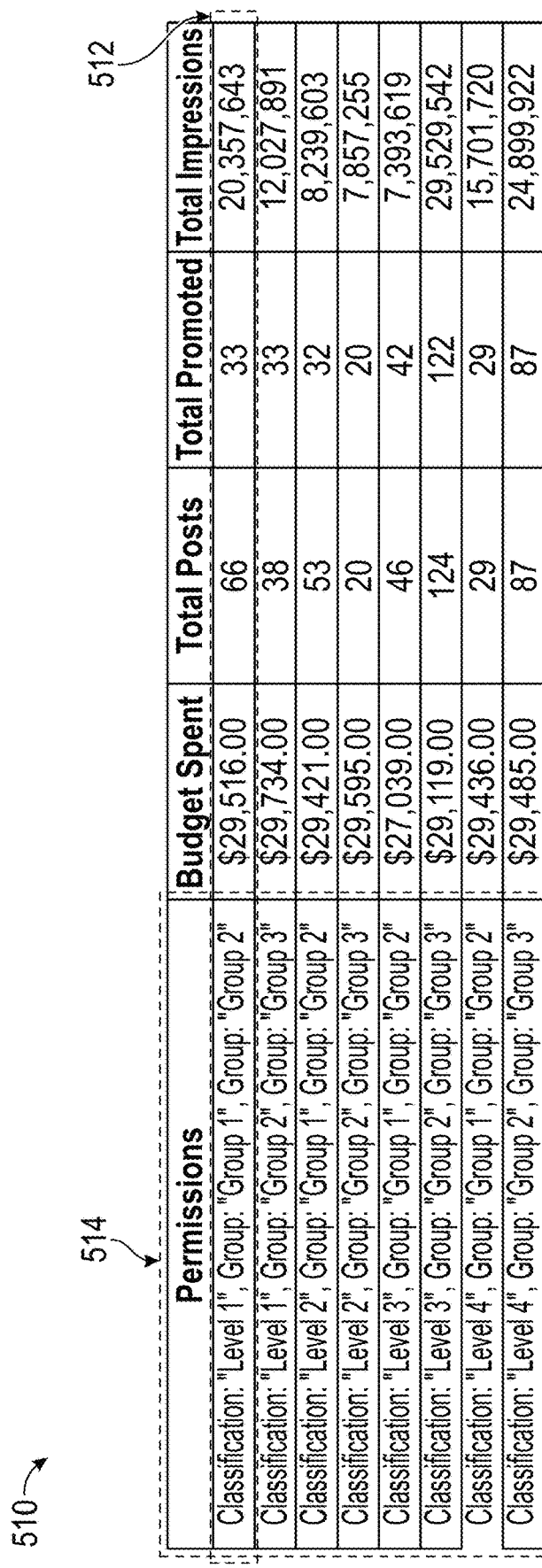

FIG. 5B shows an example of a table 510 after applying parsing rules to column 504 of table 500. For example, as shown in FIG. 5B, one or more parsing rules are applied to the first column 514 of each row 512. In the example, the parsing rules parse out a "classification" and one or more "groups" for each row. "Classification" and "group" may comprise marking types, and marking values for each may further be parsed by the parsing rules. In the example of table 510 of FIG. 5B, the permissions markings for each row include a list with one classification and two group markings (e.g., {Classification: "Level 1", Group: "Group 1", Group: "Group 2"}). The lists of permissions markings may also be represented in a simplified format of just the marking values as, for example, ["Level 1", "Group 1", "Group 2"]. These are just examples, and the system may be applied to arbitrary numbers of permissions markings, and may be used for any type of permissions markings or systems.

As also described below, after parsing the permissions information into lists of permissions markings for each row, the system can optionally determine, from the individual permissions markings, permissions information in the form of a Boolean expression for each row by converting the lists of individual markings into an expression (which expression may include a Boolean expression). For example, if a permissions system considered "classification" marking type and "group" marking type as exclusive, the system may determine to apply an "AND" operation between these permissions markings, thereby determining a Boolean expression for the above example of "'Level 1' AND 'Group 1'". In an example in which the permissions markings included two groups (e.g., "Group 1, 2") for a given row, the system may determine the markings as being inclusive, thereby determining a Boolean expression such as "'Group 1' OR 'Group 2'". A combination of the above examples may result in a Boolean expression such as "'Level 1' AND ('Group 1' OR 'Group 2')". In various implementations, the parsing rules can be customizable.

Once a dataset is processed by the system, and permissions markings for each row of the dataset are determined, the system can then advantageously provide row-level filtering of the dataset, both for accessing or viewing by a user, and for performing search queries on the dataset. As described below, the system may additionally apply one or more filtering rules to the dataset as part of the filtering process and using, e.g., the permissions marking associated with each row of the dataset and an evaluated policy associated with the user.

Figure 6A:
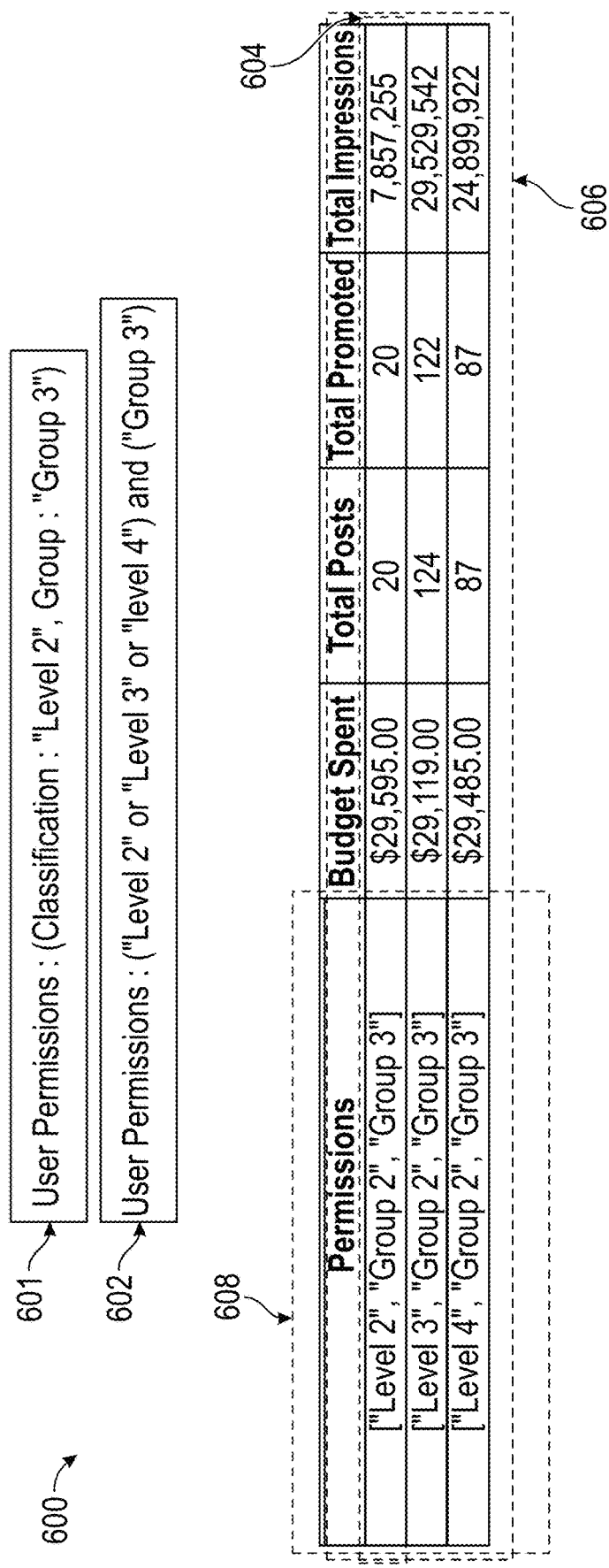
FIGS. 6A-6B show examples of filtering datasets based on evaluated policies, according to one or more embodiments.

FIG. 6A is an example of filtering table 520 based on a user's evaluated policy 602 as applied to permissions markings 608 of the rows of the table. For example, FIG. 6A shows an example of filtered table 600, filtered based on user's evaluated policy 602. As shown in the FIG. 6A, the user's permission information 601 can be converted into an evaluated policy 602 (which evaluated policy may include a Boolean expression). The filtering may include applying the evaluated policy 602 associated with a user to the permissions markings 608 of the rows of the table. For example, as shown in FIG. 6A, the user's evaluated policy 602 after conversion from the user's permission information 601 is determined as [("Level 2" OR "Level 3" OR "Level 4") AND ("Group 3")]. The system can filter the table 520 based on the user's evaluated policy 602. After filtering the table 520, the filtered table 600 can include filtered rows 606 (permissions markings associated with these rows are shown in column 608, and the table includes columns 604), having permission information of level 2 (or higher) and associating with group 3. In some embodiments, the evaluated policy and/or the lists of permissions markings can be based on a classification scheme including hierarchical categories of permissions, where each successive level of permissions allows access to information at any lower level of permissions. For example, if the user's evaluated policy 602 is ["Level 2"], the filtered dataset can show rows having permission levels 2, 3, or 4. FIG. 6A is merely an example illustration, and the user permission can be determined based on the dataset and application.

Figure 6B:
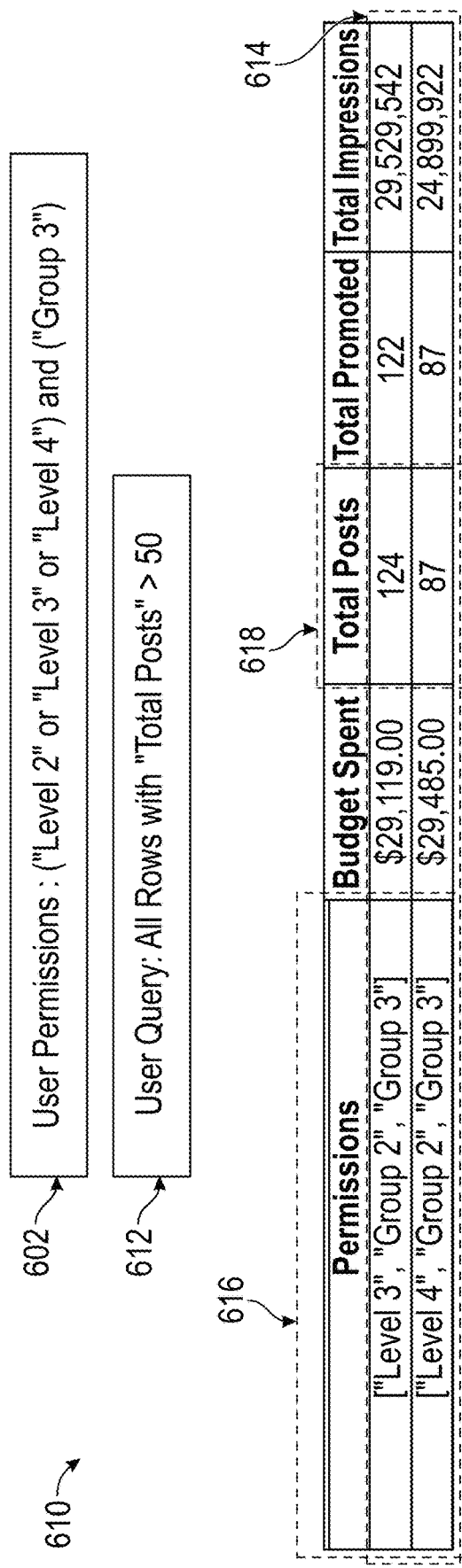

FIG. 6B is an example of a table 610, filtered based on a user's evaluated policy 602 and a search query 612. In some embodiments, the system can include a search tool to further filter the dataset by combining the user's evaluated policy and the search query 612. In these embodiments, a user can input a search query, e.g., using a search tool. As shown in FIG. 6B, the dataset can be filtered by determining the user's evaluated policy 602. The user can further filter the table using the search query 612. For example, the user's evaluated policy 602 is [("Level 2" OR "Level 3" OR "Level 4") AND ("Group 3")]. The user can further filter the table by providing a search query "Total Posts >50" 612. As a result of filtering the table 520 (shown in FIG. 5B) based on the user's evaluated policy 602 combined with the search query 612, the table 520 is filtered into table 610. The table 610 includes rows 614, including column 616, associated with the user's evaluated policy 602, and column 618, associated with the search query 612.

VIII. Example Operations of the System

Figure 7A:
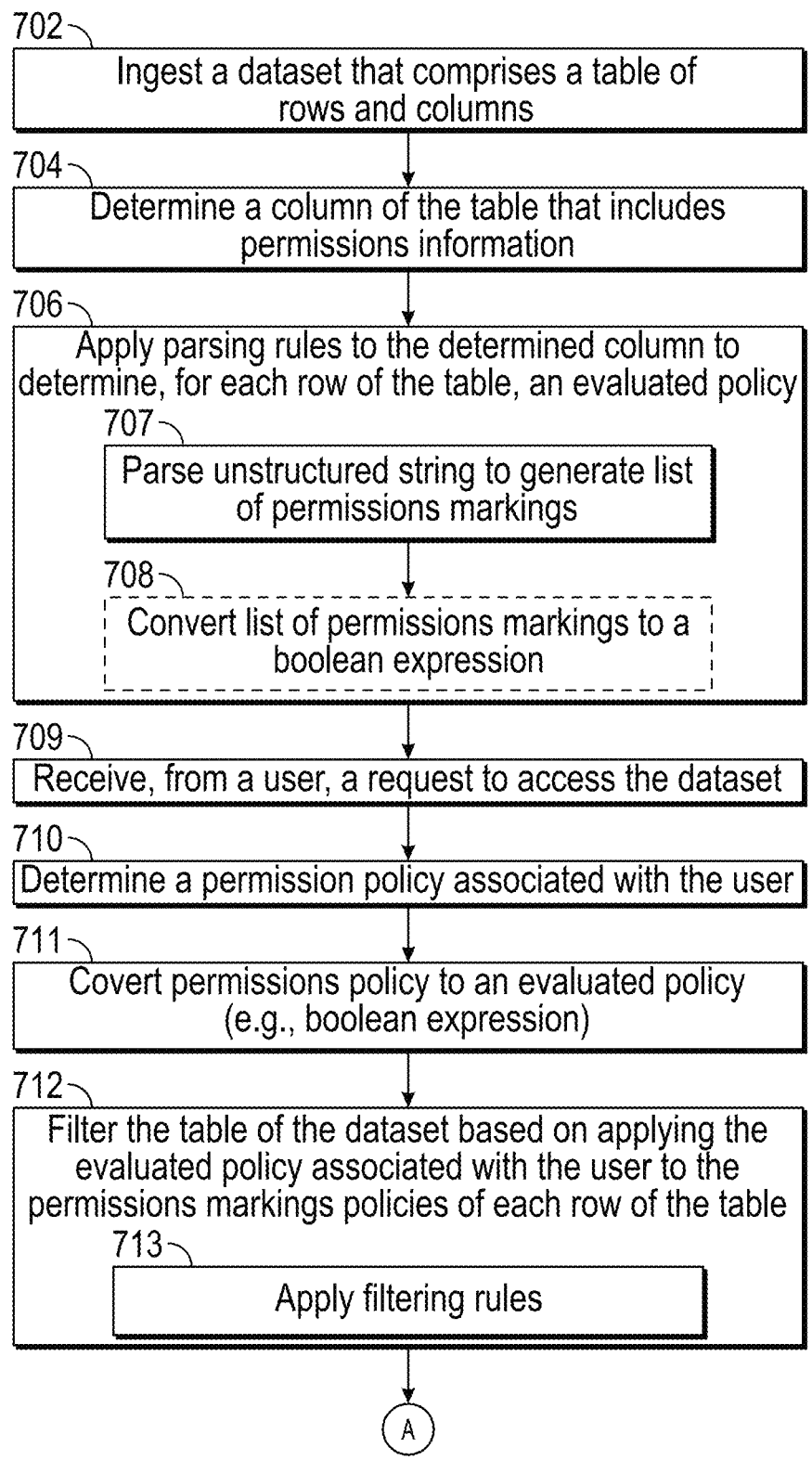
FIGS. 7A-7B show flowcharts illustrating example methods and processes of the system for row-level permissioning, according to one or more embodiments.
Figure 7A:
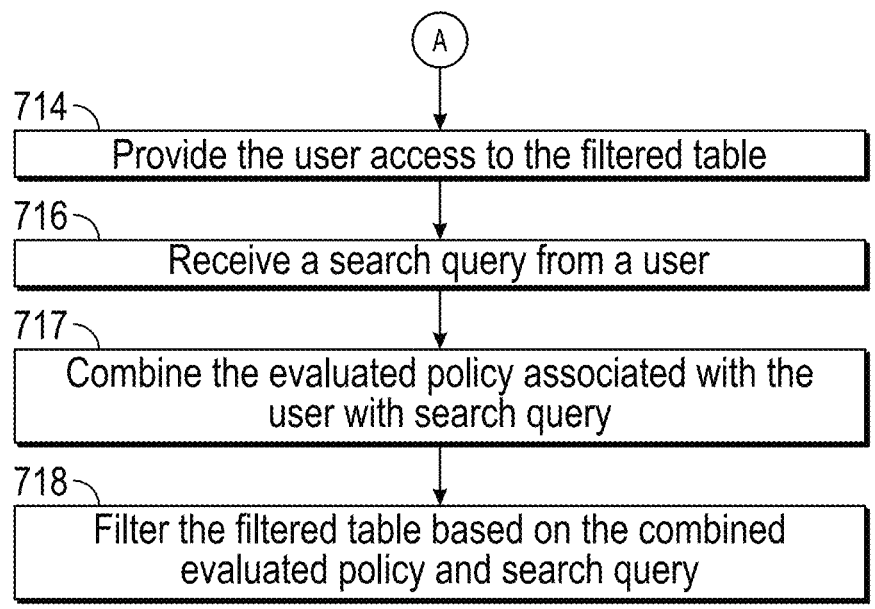
Figure 7B:
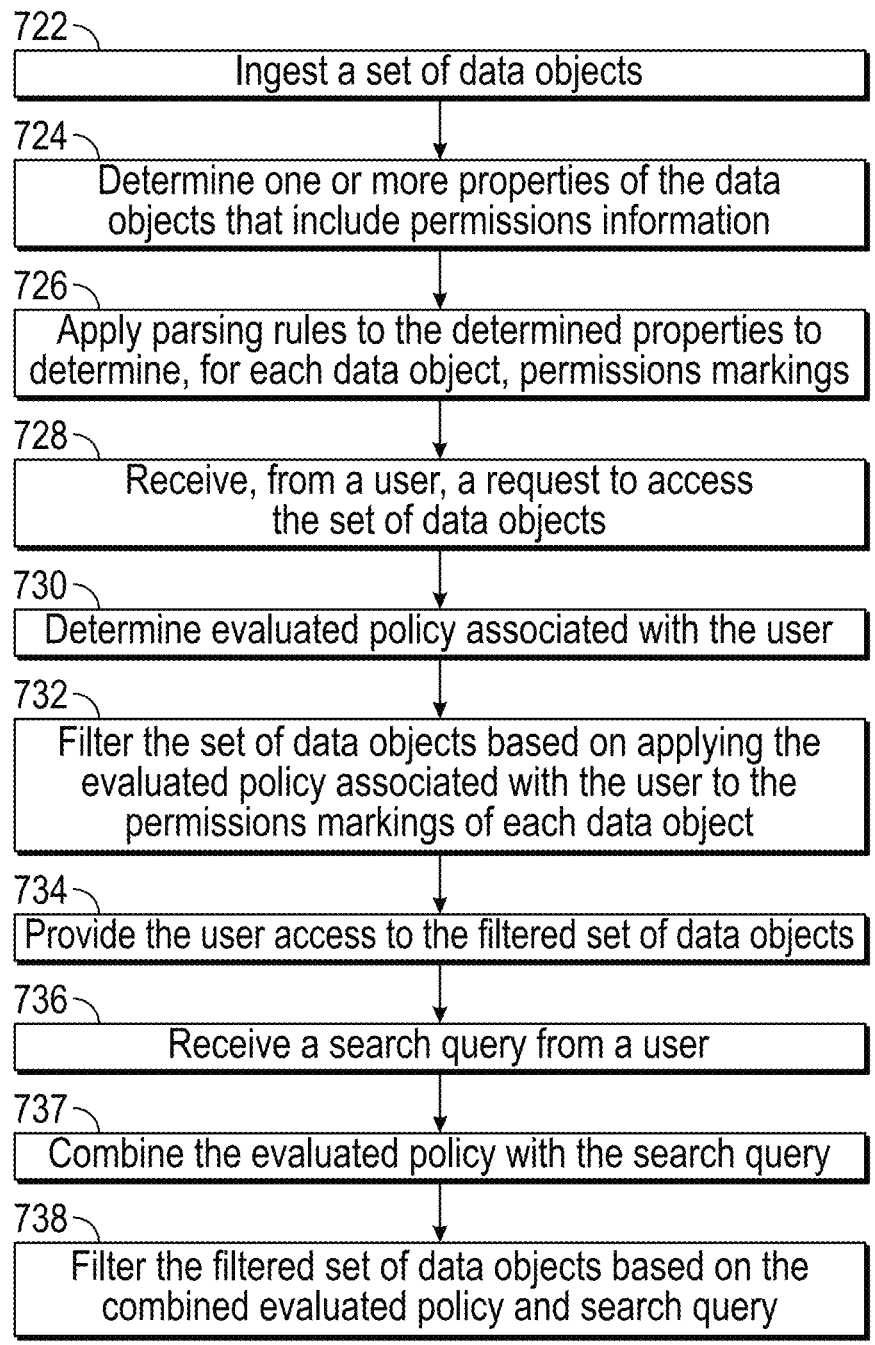

FIGS. 7A and 7B show flowcharts illustrating example operations of the system, according to one or more embodiments. The blocks of the flowchart illustrate example implementations, and in various other implementations, various blocks may be rearranged, optional, and/or omitted, and/or additional blocks may be added. The example operations of the system illustrated in FIGS. 7A and 7B may be implemented, for example, by the access service 313 of the access management system 110 and/or various aspects of the data management system 150, and such operations may follow authentication of a user (such as described with reference to FIG. 4). As mentioned above, in various implementations, an operating system, file management system, and/or other services (e.g., authentication service 311 and/or aspects of the data management system 150) can manage authentication and authorizations/permissions/privileges of a user.

Referring to FIG. 7A, at block 702, the system can ingest one or more datasets. The ingested dataset can include a table of rows and columns. Each individual row of the table can include permissions information in at least one of its columns. The ingested dataset and/or the permissions information included with the dataset can be in non-standard or idiosyncratic formats. At block 704, the system can determine a column of the table that includes the permissions information. The permissions information can be, for example, an unstructured (or structured) string (or one or more strings) of permissions information. At block 706, the system can apply parsing rules to the permissions information of the column, determined at block 704, to determine (and generate) permissions markings on each row of the ingested dataset, e.g. as a new or updated data structure. As described above, applying parsing rules can include, at block 707, parsing the permissions information (e.g., the unstructured string) included with each row of the table into a list of individual permissions markings. For example, the permissions information can be parsed to identify any classifications, groups, and/or other permissions associated with each of the rows. The list of individual permissions markings can include, for each of the individual permissions markings identified via the string parsing, an item in the list identifying the marking type, and the marking value. For example, the permissions information may include "Level 1" or "Group 1" somewhere within the unstructured string. The system can parse the string (e.g., apply the parsing rules) and identify, based on the permissions information, that the first item comprises a permissions marking associated with a "classification" type, and the second item comprises a permissions marking associated with a "group" type. The system can further, by applying the parsing rules, determine values for the permissions markings as "Level 1" and "Group 1", respectively. Thus, these items can be added to a list of permissions markings (e.g., as {Classification: "Level 1", Group: "Group 1"}, and/or the list). Optionally, at block 708, the permissions markings associated with each row of the dataset can be expressed using a Boolean expression. For example, the permissions markings can be expressed by using the permissions markings of "Level 1", "Group 1" and logical operators such as "AND" or "OR," thus, can be expressed as "Level 1" AND "Group 2".

Further referring to FIG. 7A, at block 709, the system can receive a request to access the dataset from a user. At block

710, after receiving the request, the system determines a permissions policy associated with the user. Such a permissions policy associated with the user can include, for example, classification levels, groups, and/or any other permissions information associated with the user.

At block 711, the system, by converting the user's permissions policy (or permission level) associated with the user into an expression, can determine an evaluated policy. The evaluated policy may include a Boolean expression. For example, if the user's permission is associated with "classification" marking type and "group" marking type as exclusive, the system may express the user's permission policy to apply an "AND" operation between these permissions markings, thereby determining an evaluated policy for the above example of ["Level 1" AND "Group 1"]. In an example in which the user's permission is associated with two groups (e.g., "Group 1, 2"), the system may express the user's permission policy as being inclusive, thereby expressing an evaluated policy such as ["Group 1" OR "Group 2"]. A combination of the above examples may result in an evaluated policy such as ["Level 1" AND ("Group 1" OR "Group 2")]. In various implementations, the evaluated policy can be determined based on the user's permission policy.

At block 712, the system filters the table of the dataset based on applying the evaluated policy associated with the user to the permissions markings of each row of the table. Accordingly, any rows of the table having permission markings that are not satisfied by the user's evaluated policy (and/or vice versa) are filtered out of the table and not sent to the user for display. Additionally, optionally, at block 713, the system may apply one or more filtering rules (optionally in addition to, or in place of, applying the evaluated policy associated with the user to the permissions markings associated with each row of the dataset) to filter the table. Filtering rules are also referred to herein as "granular policies". Such filtering rules may include rules that relate to certain evaluated policies associated with the user (e.g., certain permissions attributes associated with the user, such as permissions levels/classifications, groups, etc.) with certain permissions markings associated with the data (e.g., certain determined permissions included in the Boolean expression of the evaluated policies). The system may use the filtering rules to determine how user-related permissions match up with permissions associated with the data, such that any given user that accesses the data (e.g., the dataset/table) is only allowed to access data items that the user's permissions satisfy. Filtering rules may be customizable. Examples of filtering rules and their customizability are described in reference to FIGS. 9-12 herein. In various implementations, the filtering rules may be applied at the dataset level, or row or column level. At block 714, the system can provide the user access to the filtered table. In some embodiments, the system may include the user's permission information in its database or storage. In such embodiments, the system may not perform the blocks 708 and/or 710.

In some embodiments, a user can input a search query, e.g., using a search tool. The search query can be any combination of attributes in the user's permission marking, the user's logic, and/or the like, including attributes of one or more columns of the table. At block 716, the system can receive the user's search query. At block 717, the system can combine the evaluated policy associated with the user with the user's search query. For example, the evaluated policy can be combined with the search query by joining them with a logical "AND" operator. At block 718, the system can further filter the table of the dataset based on the combined evaluated policy and search query and output the further filtered table for viewing by the user (as described above).

In an implementation, the evaluated policy associated with the user may be compared to Boolean expression for each row of the dataset, rather than the lists of permissions markings.

Advantageously, evaluating the single expression (the evaluated expression associated with the user) against many values (the lists of permissions markings of the dataset) can be much more efficient than the opposite (e.g., evaluating a user's permissions markings against many expressions for each row of a dataset). Additionally, advantageously the approach described above provides further efficiencies and feasibility when incorporating search queries, as the evaluated policy associated with the user can simply be combined with the search query (e.g., with a logical "AND" operator).

In some implementations, the row-based permissions parsing and evaluation functionality described herein can be applied to other types or structures of data. For example, the system can process sets of data objects. FIG. 7B shows a flowchart illustrating an example process by which the system can parse and evaluate permissions of each data object of a set of data objects. The permissions parsing and evaluation functionality as applied to sets of data objects is similar the row-based permissions parsing and evaluation functionality. However, permissions information (including, for example, an permissions markings) may be determined for each data object (rather than each row) and based on one or more properties of each data object (rather than based on one or more columns).

Referring to FIG. 7B, at block 722, the system can ingest a set of data objects (e.g., one or more data object). Each of the data objects can include one or more properties, as described herein. At block 724, the system can determine one or more properties of the data objects that include permission information (similar to determining a column of a table including permissions information, as described above). The permissions information can be, for example, one or more unstructured (or structured) strings or object properties of permissions information. At block 726, the system can apply parsing rules to the permissions information of the properties, determined at block 724, to determine, for each object, permissions markings associated with the object. After the block 726, each ingested data object can include a property comprising permissions markings for that data object.

Further referring to FIG. 7B, at blocks 728-738 the system can receive a request to access the set of data objects from a user and filter the ingested data objects based on the user's evaluated policy and/or or by combining the user's evaluated policy and the user's search query in a manner analogous to the process described above in reference to blocks 709-718 of FIG. 7A. For example, at block 734 and block 738, the system can output the filtered set of data objects (filtered based on the user's evaluated policy) or the further filtered set of data objects (filtered based on the user's evaluated policy and the search query) for viewing by the user.

IX. Example Interactive Graphical User Interfaces

FIGS. 9-12 illustrate examples of interactive graphical user interfaces of the system, according to various embodiments. The example user interfaces are provided for illustrative purposes to show various functionalities of the system. In other implementations, the interactive graphical user interfaces may include more or fewer elements, may be arranged differently, and/or may be combined or divided. As mentioned above, the various example interactive graphical user interfaces may be generated/provided by the access service 313 of the access management system 110 and/or another service or module of the system.

The example interactive graphical user interfaces of FIGS. 9-12 are related to row-level permissioning, according to one or more embodiments. In various embodiments, the user interfaces can be used, for example, to specify parsing rules for evaluating datasets and/or to filter the data using the user's evaluated policy, where the user's evaluated policy can be represented in a Boolean expression.

Figure 9:
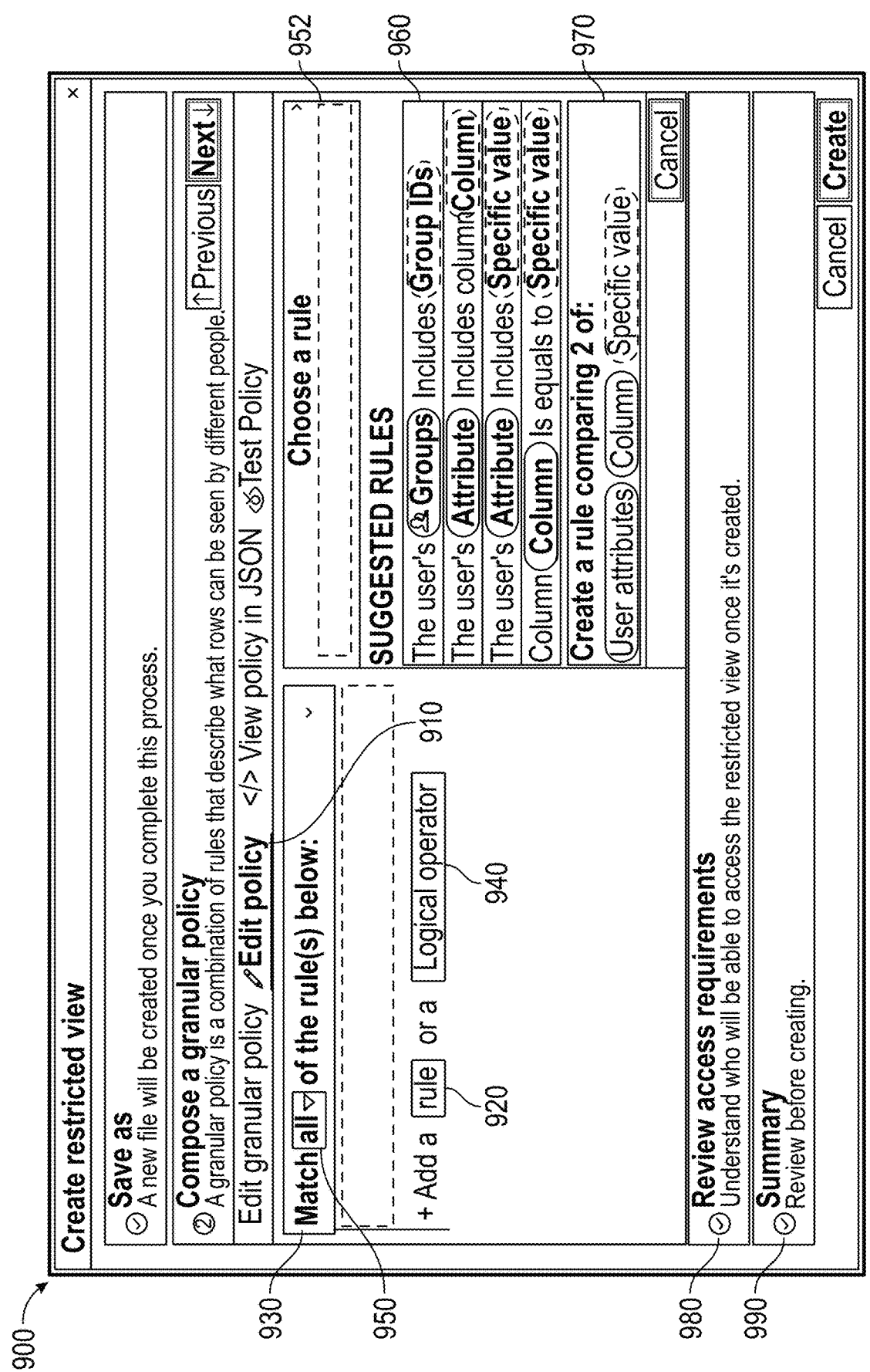

Referring to FIG. 9, a user interface 900 includes an edit granular policy tab 910. This tab may be provided by the system to allow a user to specify one or more filtering rules for implementing filtering of datasets as described herein, such as row-level filtering based on dataset-related permissions markings, and user-related evaluated policies. The filtering rules may also be used to enforce dataset-level permissioning. For example, only users with particular permissions may be allowed to access a given dataset based on filtering rules of the system. In the example, the filtering rules (also referred to herein as the granular policy) comprise one or more user-defined rules that indicate what datasets and/or rows of datasets may be accessed or seen by different users based on associated evaluated policies. Via the user interface 900, a user may specify filtering rules that may be used in relation to permission markings or other attributes for ingested datasets, such that rows of the dataset may be filtered and displayed to each viewing user based on their authorization and permissions. The user may not see rows of the dataset that have been filtered out.

Further referring to FIG. 9, the user has selected the edit policy tab 910. Details related to the selected edit policy are then displayed in the user interface in response to the user's selection. In section 930 the user may add one or more filtering rules which may be linked to one another using, e.g., logical operators. The user may select, via selector 950, whether all filtering rules should be matched when applied to a dataset or some subset of filtering rules. Additional filtering rules may be added via selector 920, and logical operators linking filtering rules may be added via selector 940. In section 952, the user can specify the details of a filtering rule to be added. The user interface includes some suggested filtering rules (or filtering rule templates) in box 960. For example, the filtering rule can include a user's groups or other attributes, and various group IDs, columns, or specific values. The user can also create a rule by comparing two of user attributes, column, and specific value via box 970. If the user chooses "AND" logical operator, the filtering rule can, for example, be "rows of data having the user's group ID 'AND' the specific value on one of its columns." After defining the one or more filtering rules, using the review access requirement 980, the user may select to review details related to application of the filtering rules (e.g., in combination with the evaluated policies and/or user's permissions policies), in additional detail. Using button 990, the user may review a summary of the filtering rules before implementing the filtering rules.

Referring to FIG. 10, a user interface 1000 is shown when a user has selected a suggested filtering rule (or filtering rule template), or selected to create their own filtering rule in user interface 900. Via user interface 1000, the user can specify details of a filtering rule to be implemented. For example, the user can create a filtering rule 1010 using two elements (e.g., "attribute and column") and a comparison method (e.g., "includes").

Referring to FIG. 11, a user interface 1100 is shown when the user has selected to enter a value for the "attribute" field in the filtering rule 1110 to be created. In box 1120, various options for attributes associated with users (e.g., permissions attributes) are displayed for the user to select. Various suggestions are displayed, and the user may use the search field to search for any attributes. In the example, shown, the user selected "Permission Level" as the attribute to be applied in this example filtering rule, but other options may be selected by the user.

Referring to FIG. 12, a user interface 1200 is shown when the user has selected to enter a value for the "column" field in the filtering rule 1210 to be created. In box 1220, various options for columns associated with data (e.g., evaluated policies attributes/values) are displayed for the user to select. Various suggestions are displayed, and the user may use the search field to search for any attributes. In the example, shown, the user selected "Permission" as the attribute to be applied in this example filtering rule, but other options may be selected by the user. For example, the user may specify particular classifications/levels, groups, and/or the like. The user may similarly define a comparison operator, in this case "satisfies", but other options may be selected by the user.

Accordingly, via the example user interfaces of FIGS. 9-12, the user may define a filtering rule that may be applied to a dataset, which filtering rule may be based on various user attributes (e.g., permissions policies, among other attributes) and attributes of the dataset (e.g., evaluated policies, among other attributes). The system may apply the one or more filtering rules to limit access to the dataset (e.g., table or data objects), which access advantageously may be limited/filter at a row level, as described herein.

X. Additional Implementation Details and Embodiments

In an implementation the system (e.g., one or more aspects of the access management system 110, the data management system 150, other aspects of the computing environment 111, and/or the like) may comprise, or be implemented in, a "virtual computing environment". As used herein, the term "virtual computing environment" should be construed broadly to include, for example, computer readable program instructions executed by one or more processors (e.g., as described in the example of FIG. 8) to implement one or more aspects of the modules and/or functionality described herein. Further, in this implementation, one or more services/modules/engines/etc. of the system may be understood as comprising one or more rules engines of the virtual computing environment that, in response to inputs received by the virtual computing environment, execute rules and/or other program instructions to modify operation of the virtual computing environment. For example, a request received from the user computing device 301 may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums). Computer readable storage mediums may also be referred to herein as computer readable storage or computer readable storage devices.

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
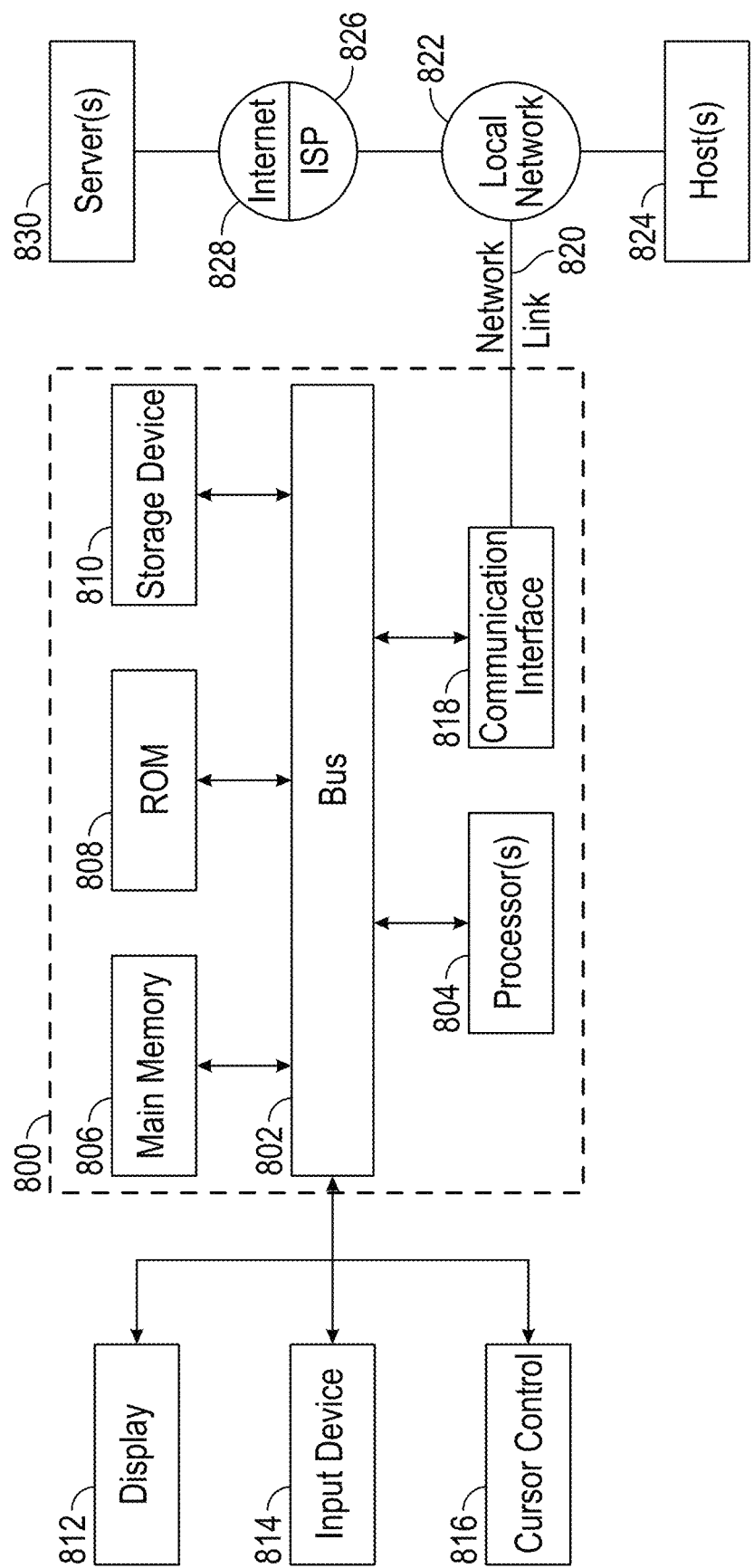
FIG. 8 shows a block diagram illustrating a computer system upon which various embodiments may be implemented.

For example, FIG. 8 shows a block diagram that illustrates a computer system 800 upon which various embodiments and/or aspects (e.g., one or more aspects of the access management system 110, the data management system 150, other aspects of the computing environment 111, and/or the like) may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random-access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

XI. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method for providing row-level data permissioning comprising: ingesting a dataset, wherein the dataset comprises a table of rows and columns; determining a column of the table that includes permissions information; applying parsing rules to the column to determine, for each row of the table, a list of permissions markings; receiving, from a user, a request to access the dataset; and in response to receiving the request: determining a permissions policy associated with the user; determining an evaluated policy associated with the user based on the permissions policy; filtering the table based on applying the evaluated policy associated with the user to the permissions markings of each row of the table; and providing the user access to the filtered table.

Clause 2: The computer-implemented method of Clause 1, wherein the filtering further comprises applying one or more filtering rules to the evaluated policy and the permissions markings, and wherein the filtering rules comprise a customizable set of filtering rules.

Clause 3: The computer-implemented method of any of Clauses 1-2, wherein the evaluated policy comprises a Boolean expression.

Clause 4: The computer-implemented method any of Clauses 1-3, wherein the lists of permissions markings are determined from unstructured strings of permissions information.

Clause 5: The computer-implemented method any of Clauses 1-4 further comprising: receiving, from the user, a search query; combining the evaluated policy associated with the user with the search query; and filtering the filtered table based on the combined evaluated policy and search query.

Clause 6: The computer-implemented method of any of Clauses 1-5 further comprising: providing one or more user interfaces configured to allow user-specification of one or more filtering rules.

Clause 7: The computer-implemented method of Clause 6, wherein user-specification of the filtering rules comprises specifying at least one of: a user attribute, a column of a dataset, or a specific value.

Clause 8: A system comprising: a computer readable storage medium having program instructions embodied therewith; and one or more processors configured to execute the program instructions to cause the system to perform the computer-implemented method of any of Clauses 1-7.

Clause 9: A computer program product comprising a computer readable storage medium having program instructions embodied therewith, the program instructions executable by one or more processors to cause the one or more processors to perform the computer-implemented method of any of Clauses 1-7.

Clause 10: A computer-implemented method for providing object-level data permissioning comprising: ingesting a dataset, wherein the dataset comprises a set of data objects; determining one or more properties of the data objects that include permissions information; applying parsing rules to the determined properties to determine, for each data object, a list of permissions markings; receiving, from a user, a request to access the dataset; and in response to receiving the request: determining a permissions policy associated with the user; determining an evaluated policy associated with the user based on the permissions policy; filtering the set of data objects based on applying the evaluated policy associated with the user to the permissions markings of each data object of the set of data objects; and providing the user access to the filtered set of data objects.

Clause 11: The computer-implemented method of Clause 10, wherein the filtering further comprises applying one or more filtering rules to the evaluated policy and the permissions markings, and wherein the filtering rules comprise a customizable set of filtering rules.

Clause 12: The computer-implemented method of any of Clauses 10-11, wherein the evaluated policy comprises a Boolean expression.

Clause 13: The computer-implemented method of any of Clauses 10-12, wherein the lists of permissions markings are determined from unstructured strings of permissions information.

Clause 14: The computer-implemented method of any of Clauses 10-13 further comprising: receiving, from the user, a search query; combining the evaluated policy associated with the user with the search query; and filtering the filtered set of data objects based on the combined evaluated policy and search query.

Clause 15: The computer-implemented method of any of Clauses 10-14 further comprising: providing one or more user interfaces configured to allow user-specification of one or more filtering rules.

Clause 16: The computer-implemented method of Clause 15, wherein user-specification of the filtering rules comprises specifying at least one of: a user attribute, a column of a dataset, or a specific value.

Clause 17: A system comprising: a computer readable storage medium having program instructions embodied therewith; and one or more processors configured to execute the program instructions to cause the system to perform the computer-implemented method of any of Clauses 10-16.

Clause 18: A computer program product comprising a computer readable storage medium having program instructions embodied therewith, the program instructions executable by one or more processors to cause the one or more processors to perform the computer-implemented method of any of Clauses 10-16.

What is claimed is:

1. A computer system configured to provide row-level data permissioning, the computer system comprising:
one or more computer readable storage devices configured to store at least a plurality of computer readable instructions; and
one or more processors configured to execute the plurality of computer readable instructions to cause the computer system to perform operations comprising:
ingesting a dataset, wherein the dataset comprises a table of rows and columns;
determining a column of the table that includes permissions information;
modifying the table, wherein modifying the table includes:
applying parsing rules to the column and each row of the table to determine, for each row of the table, a list of permissions markings comprising values for a plurality of different marking types in a standard format usable to filter the modified table, wherein the list of permissions markings comprises a delimited list of individual ones of the marking types and associated values; and
inserting the respective determined lists of permissions markings into the respective associated rows of the table;
receiving, from a user and via an interactive user interface, a request to access the dataset; and
in response to receiving the request:
determining a permissions policy associated with the user;
determining an evaluated policy associated with the user based on the permissions policy;
filtering the modified table, without replicating the dataset in the modified table, based on applying the evaluated policy associated with the user to the permissions markings of each row of the modified table, wherein the filtering filters the dataset of the modified table to only include rows that satisfy the evaluated policy without duplicating the permission markings into other datasets; and
providing, via the interactive user interface, the user access to the filtered modified table.

2. The computer system of claim 1, wherein the filtering further comprises applying one or more filtering rules to the evaluated policy and the permissions markings, and wherein the filtering rules comprise a customizable set of filtering rules.

3. The computer system of claim 1, wherein the evaluated policy comprises a Boolean expression.

4. The computer system of claim 1, wherein the lists of permissions markings are determined from unstructured strings of permissions information.

5. The computer system of claim 1, wherein the operations further comprise:
receiving, from the user, a search query;
combining the evaluated policy associated with the user with the search query; and
filtering the filtered table based on the combined evaluated policy and search query.

6. The computer system of claim 1, wherein the operations further comprise:
providing one or more user interfaces configured to allow user-specification of one or more filtering rules.

7. The computer system of claim 6, wherein user-specification of the filtering rules comprises specifying at least one of: a user attribute, a column of a dataset, or a specific value.

8. The computer system of claim 1, wherein said ingesting includes forming the table by accessing to an access management system included in the computer system, wherein the access management system is configured to store the dataset in a database by associating each data of the dataset with data objects stored in an ontology of the access management system.

9. A computer system configured to provide object-level data permissioning, the computer system comprising:
one or more computer readable storage devices configured to store at least a plurality of computer readable instructions; and one or more processors configured to execute the plurality of computer readable instructions to cause the computer system to perform operations comprising:
  ingesting a dataset, wherein the dataset comprises a set of data objects;
  determining one or more properties of the data objects that include permissions information;
  modifying the set of data objects, wherein modifying the set of data objects includes:
    applying parsing rules to each property of the determined one or more properties to determine, for each data object, a list of permissions markings comprising values for a plurality of different marking types in a standard format usable to filter the modified set of data objects, wherein the list of permissions markings comprises a delimited list of individual ones of the marking types and associated values; and
    inserting the respective determined lists of permissions markings into the respective associated properties of the data objects;
  receiving, from a user and via an interactive user interface, a request to access the dataset; and
  in response to receiving the request:
    determining a permissions policy associated with the user;
    determining an evaluated policy associated with the user based on the permissions policy;
    filtering the modified set of data objects, without replicating the set data objects included in the dataset, based on applying the evaluated policy associated with the user to the permissions markings of each modified data object of the set of data objects, wherein the filtering filters the dataset of the modified set of objects to only include data objects that satisfy the evaluated policy without duplicating the permission markings into other set of data objects; and
    providing, via an interactive user interface, the user access to the filtered modified set of data objects.

10. The computer system of claim 9, wherein the filtering further comprises applying one or more filtering rules to the evaluated policy and the permissions markings, and wherein the filtering rules comprise a customizable set of filtering rules.

11. The computer system of claim 9, wherein the evaluated policy comprises a Boolean expression.

12. The computer system of claim 9, wherein the lists of permissions markings are determined from unstructured strings of permissions information.

13. The computer system of claim 9, wherein the operations further comprise:
  receiving, from the user, a search query;
  combining the evaluated policy associated with the user with the search query; and
  filtering the filtered set of data objects based on the combined evaluated policy and search query.

14. The computer system of claim 9, wherein the operations further comprise:
  providing one or more user interfaces configured to allow user-specification of one or more filtering rules.

15. The computer system of claim 14, wherein user-specification of the filtering rules comprises specifying at least one of: a user attribute, a column of a dataset, or a specific value.

16. A computer-implemented method for providing row-level data permissioning comprising:
  ingesting a dataset, wherein the dataset comprises a table of rows and columns;
  determining a column of the table that includes permissions information;
  modifying the table, wherein modifying the table includes:
    applying parsing rules to the column and each row of the table to determine, for each row of the table, a list of permissions markings comprising values for a plurality of different marking types in a standard format usable to filter the modified table, wherein the list of permissions markings comprises a delimited list of individual ones of the marking types and associated values; and
    inserting the respective determined lists of permissions markings into the respective associated rows of the table;
  receiving, from a user and via an interactive user interface, a request to access the dataset; and
  in response to receiving the request:
    determining a permissions policy associated with the user;
    determining an evaluated policy associated with the user based on the permissions policy;
    filtering the modified table, without replicating the dataset in the modified table, based on applying the evaluated policy associated with the user to the permissions markings of each row of the modified table, wherein the filtering filters the dataset of the modified table to only include rows that satisfy the evaluated policy without duplicating the permission markings into other datasets; and
    providing, via the interactive user interface, the user access to the filtered modified table.

17. The computer-implemented method of claim 16, wherein the filtering further comprises applying one or more filtering rules to the evaluated policy and the permissions markings, and wherein the filtering rules comprise a customizable set of filtering rules.

18. The computer-implemented method of claim 16, wherein the evaluated policy comprises a Boolean expressions.

19. The computer-implemented method of claim 16, wherein the lists of permissions markings are determined from unstructured strings of permissions information.

20. The computer-implemented method of claim 16 further comprising:
  receiving, from the user, a search query;
  combining the evaluated policy associated with the user with the search query; and
  filtering the filtered table based on the combined evaluated policy and search query.

* * * * *